UNITED STATES PATENT OFFICE 2,328,890

2-CYANO-1,3-BUTADIENES

Albert M. Clifford and John R. Long, Akron, Ohio, assignors to Wingfoot Corporation, Akron, Ohio, a corporation of Delaware No Drawing. Application January 18, 1940, Serial No. 314,462

16 Claims. (Cl. 260—464)

This invention relates to new compounds containing a nitrile radical and to methods of preparing the same. More particularly, it relates to compounds which include those of unsaturated nature intended for use in the preparation of polymerized compositions.

In the preparation of polymerized compositions suitable as rubber substitutes and as ingredients of varnishes, lacquers and the like, various unsaturated substances have been polymerized, either alone or in admixture with other unsaturated compounds. From a consideration of the properties requisite in such monomers as have been successfully polymerized, it was deduced that those butadienes containing a nitrile radical might be polymerized, alone or with other monomers, to yield useful compositions. However, these compounds had not previously been prepared, attempts to prepare 2-cyano-1,3-butadiene having been unsuccessful. Hence, one object of the present invention is to prepare 2-cyano-1,3-butadienes and another object is to prepare useful polymers therefrom. Other objects are also attained in the practice of the invention, as will appear hereinafter.

In order to produce these cyanobutadienes, the method of the invention comprises first preparing a 2-cyanodiacetoxy butane, these also being new compounds, and then pyrolyzing this intermediate to yield a 2-cyano-1,3-butadiene. To illustrate the process, the following examples are given, but it will be understood that the same are merely by way of illustration and that the invention is not limited thereto.

Example 1

Into 246 grams of 3-acetoxy-2-butanone there was passed 51.5 grams of hydrogen cyanide, the temperature being maintained between 40 and 50° C. during the operation. The mixture, containing a nitrile compound, was then acetylated with 212 grams of acetic anhydride containing 5 grams of sulphuric acid. The reaction mixture was fractionated under reduced pressure to give 2-cyano-2,3-diacetoxy butane having a boiling point of 124–138° C./8 mm. The density was $d_{30}=1.0905$, and the index of refraction was $n_D^{26}=1.4282$. The compound has not previously been described.

The reactions involved in the foregoing example may be represented by the following equations:

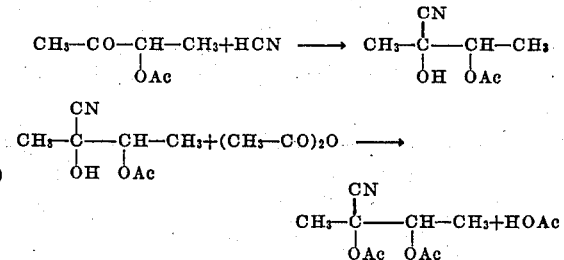

Example 2

The product of the foregoing example, 2-cyano-2,3-diacetoxy butane, was then pyrolyzed in a heated tube at a temperature of 550–565° C., while the pressure was maintained at that corresponding to about 30 to 40 mm. of mercury. The pyrolyzed material was separated by distillation at reduced pressure, and the unreacted material was again pyrolyzed. After the intermediate had thus been broken down, acetic acid was removed by washing the product with a saturated common salt solution and final traces of acid were removed with sodium carbonate. The crude product was dried and distilled to give the final product, 2-cyano-1,3-butadiene, having a boiling point of 53–58° C./11 mm. The density was $d_{31}=0.8292$, and the index of refraction was $n_D^{29}=1.4435$. This compound is believed to be new.

The reaction involved in the pyrolysis is probably as follows:

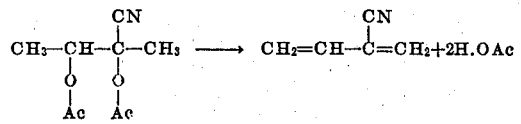

Example 3

In another preparation, 408 grams of 1-hydroxy-2-methyl-3-butanone was treated with 108 grams of hydrogen cyanide and then with 897 grams of acetic anhydride in the manner described above, to yield 2-methyl-3-cyano-1,3-diacetoxybutane. This intermediate compound, which is believed to be new, had a boiling point of 148–158° C./11 mm. The density was $d_{30}=1.0865$, and the index of refraction was $n_D^{25}=1.4402$. This intermediate was then pyrolyzed at a temperature of 540–550° C. under 11 mm./Hg pressure and the product was worked up in the manner described in Example 2 to give 2-methyl-3-cyano-1,3-butadiene,

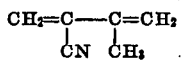

having a boiling point of 62–70° C./44 mm. The density was $d_{28}=0.8546$, and the index of refraction was $n_D^{31}=1.4545$.

It will be observed from the foregoing examples that the process involves the preparation of an intermediate, a 2-cyano diacetoxybutane, by treatment of a butanone which already carries one acetoxy radical or a hydroxy radical with hydrogen cyanide to convert the ketone to a cyanhydrine. On acetylation of the cyanhydrine with acetic anhydride the result, in either case, is the introduction of one or two acetoxy groups, the product being a 2-cyanodiacetoxybutane. This compound is then pyrolyzed at a suitable elevated temperature, say 450–650° C., and preferably 525° to 575° C. to split off two molecules of acetic acid and leave a butadiene which carries a nitrile substituent. The conditions set forth in the examples can be varied, of course, the temperature at which the hydrogen cyanide gas is passed in being preferably in the neighborhood of 40–60° C., and that of acetylation somewhat higher, from 100–120° C. Distillation of this intermediate and of the pyrolyzed product should be carried out under reduced pressure, a pressure corresponding to 10–60 mm. of mercury being found satisfactory.

The 2-cyanobutadienes prepared above were next subjected to polymerizing conditions in admixture with butadiene itself, the latter being a well-known ingredient of copolymers. Examples illustrating the procedure and results are as follows, although, of course, it will be understood that the polymerizing conditions given may be varied in accordance with established practice:

*Example 4*

To a mixture of 8.3 grams of butadiene and 8.3 grams of 2-methyl-3-cyano-1,3-butadiene was added 0.48 gram of CCl₄ and the whole was emulsified in a solution consisting of 10 cc. of 5% Aquarex D, 10 cc. of phosphate-citrate buffer (pH=7.0) and 0.113 grams of sodium perborate. This mixture was agitated at a temperature of 38° C. for a period of 68 hours, after which time the resulting latex was coagulated with alcohol and the copolymer was dried. A soft, tough and tacky rubber-like material was obtained in good yield.

*Example 5*

To show the polymerizable nature of the substance obtained in Example 2, a small crystal of benzoyl peroxide was added to 1 gram of 2-cyano-1,3-butadiene. After one day at a temperature of 38° C. the compound had solidified. On examination after 48 hours, the resulting polymer was found to be a tough, resilient rubber-like mass.

*Example 6*

Another mixture of 9.6 grams of butadiene, 6.4 grams of 2-cyano-1,3-butadiene and 0.48 gram of CCl₄ were mixed and emulsified with the same ingredients and in the same manner as set forth in Example 4 above. At the end of 48 hours at a temperature of 38° C., the polymer was precipitated with alcohol and dried. A rubber-like solid was obtained in good yield.

From the foregoing it will be obvious that the present invention embraces within its scope various new compounds, namely the 2-cyano diacetoxy butanes, such as 2-cyano-2,3-diacetoxybutane, 2-methyl-3-cyano-1,3-diacetoxybutane, 2-cyano-3-methyl-2,3-diacetoxybutane, 3-cyano-1,3-diacotoxybutane; 2-ethyl-3-cyano-1,3-diacetoxybutane, 2-phenyl-3-cyano 1,3-diacetoxybutane, 4-phenyl-2-cyano-2,3-diacetoxybutane, and the 2-cyano-1,3-butadienes, such as 2-cyano-1,3-butadiene, 2-methyl-3-cyano-1,3-butadiene, 2-ethyl-3-cyano 1,3-butadiene, 2-phenyl-3-cyano-1,3-butadiene and 4-phenyl-2-cyano-1,3-butadiene. It also includes various polymers which may be prepared from the 2-cyano-1,3-butadienes, either by the polymerization of the compound by itself or by the copolymerization of any one of the 2-cyano-1,3-butadienes with another monomer such as butadiene, isoprene, acrylic nitrile, methacrylic-nitrile, styrene and ring-substituted chlorostyrene, alkoxy styrene, vinylidene chloride, acrylic- and methacrylic acid esters, such as ethyl acrylate, methyl methacrylate, n-butyl methacrylate, the vinyl ketones, vinyl ethers, etc. It also includes methods of preparing the 2-cyano diacetoxybutanes and the 2-cyano 1,3-butadienes.

While there have been described above certain preferred embodiments of the invention, the latter is not limited thereto, but only by the appended claims wherein it is intended to set forth all features of patentable novelty residing in the invention.

What we claim is:

1. A method of preparing 2-cyano-1,3-butadienes having at least one other substituent from the group consisting of alkyl and aryl which comprises pyrolyzing a correspondingly substituted 2-cyano diacetoxy butane.

2. A method of preparing 2-cyano-1,3-butadienes having one other substituent from the group consisting of alkyl and aryl which comprises pyrolyzing a correspondingly substituted 2-cyano diacetoxy butane, distilling off the 2-cyano-1,3-butadiene and removing acetic acid therefrom.

3. A method of preparing 2-cyano-1,3-butadienes having at least one other substituent from the group consisting of alkyl and aryl which comprises pyrolyzing a correspondingly substituted cyano diacetoxy butane at a temperature between about 450° and 650° C. under a pressure corresponding to 10 to 60 mm. of mercury, distilling off the 2-cyano-1,3-butadiene and removing acetic acid therefrom.

4. A method of preparing 2-cyano-1,3-butadienes having at least one other substituent from the group consisting of alkyl and aryl which comprises pyrolyzing a correspondingly substituted 2-cyano diacetoxy butane at a temperature between about 450° and 650° C. under a pressure corresponding to 10 to 60 mm. of mercury, distilling off the 2-cyano-1,3-butadiene and removing acetic acid by washing with saturated sodium chloride solution.

5. A method of preparing 2-cyano-1,3-butadienes having one other substituent from the group consisting of alkyl and aryl which comprises pyrolyzing a correspondingly substituted 2-cyano diacetoxy butane at a temperature between about 525° and 575° C., distilling off the 2-cyano-1,3-butadiene and removing acetic acid therefrom.

6. A method of preparing 2-cyano-1,3-butadienes having at least one other substituent from the group consisting of alkyl and aryl which comprises treating a correspondingly substituted acetoxy butanone with hydrogen cyanide, acetylating the nitrile so formed and pyrolyzing the diacetoxy compound to produce a 2-cyano-1,3-butadiene.

7. A method of preparing 2-cyano-1,3-butadienes having one other substituent from the group consisting of alkyl and aryl which comprises treating a correspondingly substituted hydroxy butanone with hydrogen cyanide and acetic anhydride and pyrolyzing the resulting diacetoxy compound to produce a 2-cyano-1,3-butadiene.

8. A method of preparing 2-cyano-1,3-butadienes having at least one other substituent from the group consisting of alkyl and aryl which comprises treating a correspondingly substituted acetoxybutanone with hydrogen cyanide, reacting the nitrile so formed with acetic anhydride, and pyrolyzing the resulting diacetoxy compound to produce a 2-cyano-1,3-butadiene.

9. The 2-cyano-1,3-butadienes having at least one other substituent from the group consisting of alkyl and aryl.

10. The 2-cyano 3-alkyl butadienes.

11. The 2-cyano 3-aryl butadienes.

12. The 2-cyano 4-aryl butadienes.

13. 2-cyano 3-methyl butadiene.

14. 2-cyano 3-phenyl butadiene.

15. 2-cyano 4-phenyl butadiene.

16. The 2-cyano 1,3-butadienes having one other substituent from the group consisting of alkyl and aryl.

ALBERT M. CLIFFORD.
JOHN R. LONG.